US009626601B2

(12) United States Patent
Kuznetsov

(10) Patent No.: US 9,626,601 B2
(45) Date of Patent: Apr. 18, 2017

(54) IDENTIFYING IMAGE TRANSFORMATIONS FOR IMPROVING OPTICAL CHARACTER RECOGNITION QUALITY

(71) Applicant: ABBYY Development LLC, Moscow (RU)

(72) Inventor: Sergey Kuznetsov, Moscow Region (RU)

(73) Assignee: ABBYY Development LLC (RU)

( * ) Notice: Subject to any disclaimer, the term of this patent is extended or adjusted under 35 U.S.C. 154(b) by 131 days.

(21) Appl. No.: 14/572,022

(22) Filed: Dec. 16, 2014

(65) Prior Publication Data

US 2016/0092754 A1   Mar. 31, 2016

(30) Foreign Application Priority Data

Sep. 30, 2014 (RU) .................. 2014139550

(51) Int. Cl.
*G06K 9/03* (2006.01)
*G06K 9/20* (2006.01)
*G06K 7/10* (2006.01)
*G06K 9/72* (2006.01)
*G06K 9/00* (2006.01)
*G06K 9/62* (2006.01)

(52) U.S. Cl.
CPC ........... *G06K 9/72* (2013.01); *G06K 9/00442* (2013.01); *G06K 9/6203* (2013.01)

(58) Field of Classification Search
CPC .... G06K 2209/01; G06K 9/6292; G06K 9/03; G06K 9/00463; G06K 9/00442; G06K 9/033; G06K 9/72; G06K 9/6203
USPC ................................ 382/225, 282, 310, 321
See application file for complete search history.

(56) References Cited

U.S. PATENT DOCUMENTS

| | | | |
|---|---|---|---|
| 5,815,198 A | 9/1998 | Vachtsevanos et al. | |
| 5,930,393 A * | 7/1999 | Ho ....................... | G06K 9/6807 382/170 |
| 6,922,487 B2 * | 7/2005 | Dance ................ | G06K 9/00456 382/190 |
| 7,650,035 B2 * | 1/2010 | Vincent .............. | G06K 9/00463 382/225 |
| 2007/0253032 A1 | 11/2007 | Keydar et al. | |

* cited by examiner

*Primary Examiner* — Kanjibhai Patel
(74) *Attorney, Agent, or Firm* — LeighAnn Weiland; Veronica Weinstein

(57) ABSTRACT

Systems and methods for identifying transformations to be applied to at least part of a document image for improving the OCR quality. An example method comprises: constructing, by a computer system, an ordered list of transformations to be applied to an image comprising a character string, each transformation corresponding to a hypothesis asserted with respect to one or more characteristics of the image; applying, to the image, a leading transformation on the list to produce a transformed image; evaluating a quality of the transformed image to produce a quality estimate; and updating the list in view of the quality estimate.

18 Claims, 4 Drawing Sheets

IDENTIFYING IMAGE TRANSFORMATIONS FOR IMPROVING OPTICAL CHARACTER RECOGNITION QUALITY

CROSS REFERENCE TO RELATED APPLICATIONS

This application claims the benefit of priority to Russian patent application no. 2014139550, filed Sep. 9, 2014; the disclosure of which is incorporated herein by reference.

TECHNICAL FIELD

The present disclosure is generally related to computer systems, and is more specifically related to systems and methods for processing electronic documents.

BACKGROUND

An electronic document may be produced by scanning or otherwise acquiring an image of a paper document and performing optical character recognition to produce the text associated with the document.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for identifying transformations to be applied to at least part of a document image for improving the quality of optical character recognition (OCR).

"Electronic document" herein shall refer to a file comprising one or more digital content items that may be visually rendered to provide a visual representation of the electronic document (e.g., on a display or a printed material). An electronic document may be produced by scanning or otherwise acquiring an image of a paper document and performing optical character recognition to produce the text associated with the document. In various illustrative examples, electronic documents may conform to certain file formats, such as PDF, DOC, ODT, etc.

"Computing device" herein shall refer to a data processing device having a general purpose processor, a memory, and at least one communication interface. Examples of computing devices that may employ the methods described herein include, without limitation, desktop computers, notebook computers, tablet computers, and smart phones.

An optical character recognition (OCR) system may acquire an image of a paper document and transform the image into a computer-readable and searchable format comprising the textual information extracted from the image of the paper document. In various illustrative examples, an original paper document may comprise one or more pages, and thus the document image may comprise images of one or more document pages. In the following description, "document image" shall refer to an image of at least a part of the original document (e.g., a document page).

In certain implementations, the OCR process efficiency and/or quality may be improved by performing certain transformations of the image before the actual character recognition operation. Such transformations may be directed modifying the character slope angle, character stroke width, cap height, contrast level, and/or other characteristics of the image. The present disclosure describes systems and methods for efficiently identifying a sequence of one or more transformations to be applied to at least part of a document image for improving the quality of optical character recognition (OCR).

Various aspects of the above referenced methods and systems are described in details herein below by way of examples, rather than by way of limitation.

Figure 1:
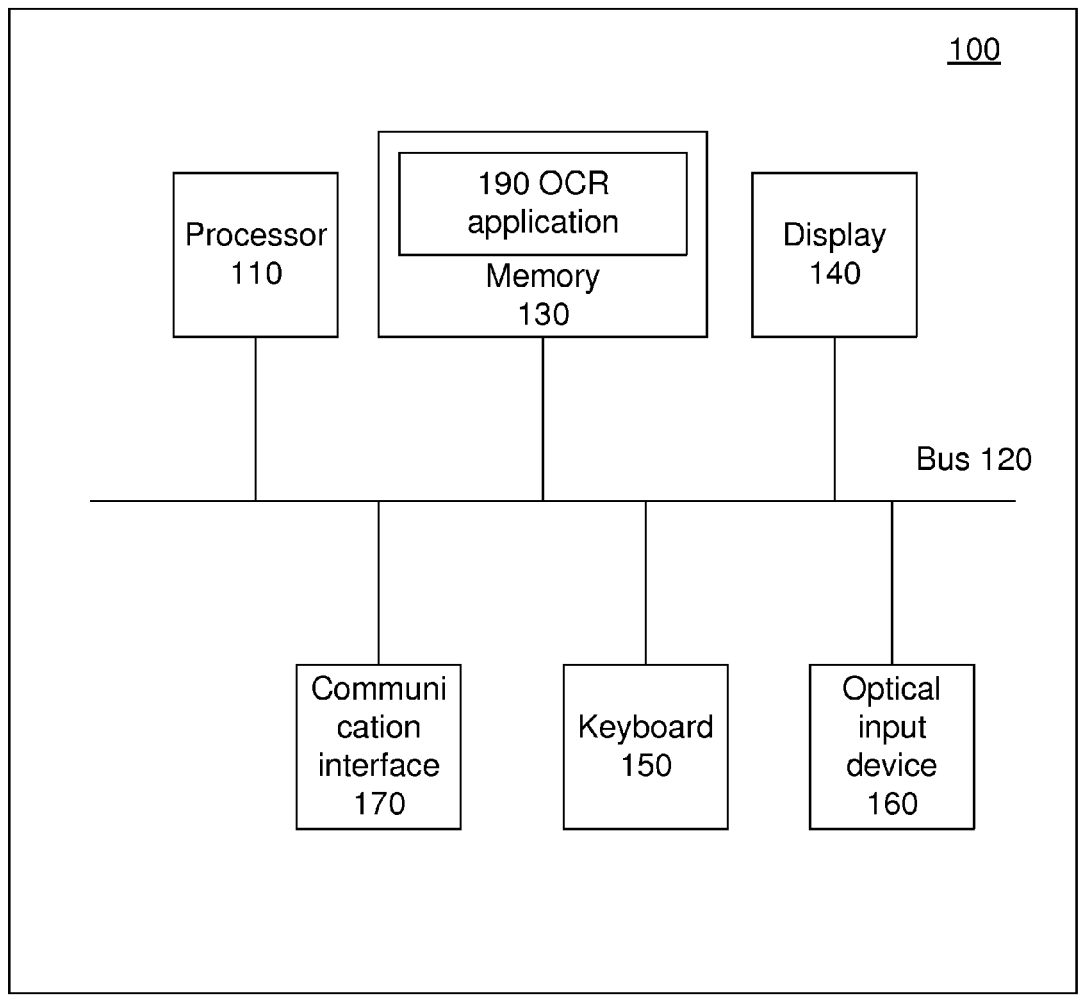
FIG. 1 depicts a block diagram of one embodiment of a computing device operating in accordance with one or more aspects of the present disclosure.

FIG. 1 depicts a block diagram of one illustrative example of a computing device 100 operating in accordance with one or more aspects of the present disclosure. In illustrative examples, computing device 100 may be provided by various computing devices including a tablet computer, a smart phone, a notebook computer, or a desktop computer.

Computing device 100 may comprise a processor 110 coupled to a system bus 120. Other devices coupled to system bus 120 may include a memory 130, a display 140, a keyboard 150, an optical input device 160, and one or more communication interfaces 170. The term "coupled" herein shall refer to being electrically connected and/or communicatively coupled via one or more interface devices, adapters and the like.

In various illustrative examples, processor 110 may be provided by one or more processing devices, such as general purpose and/or specialized processors. Memory 130 may comprise one or more volatile memory devices (for example, RAM chips), one or more non-volatile memory devices (for example, ROM or EEPROM chips), and/or one or more storage memory devices (for example, optical or magnetic disks). Optical input device 160 may be provided by a scanner or a still image camera configured to acquire the light reflected by the objects situated within its field of view. An example of a computing device implementing aspects of the present disclosure will be discussed in more detail below with reference to FIG. 4.

Memory 130 may store instructions of application 190 for performing optical character recognition. In certain implementations, application 190 may perform methods of identifying transformations to be applied to at least part of a document image for improving the OCR quality, in accordance with one or more aspects of the present disclosure. In an illustrative example, application 190 may be implemented as a function to be invoked via a user interface of another application. Alternatively, application 190 may be implemented as a standalone application.

Figure 2:
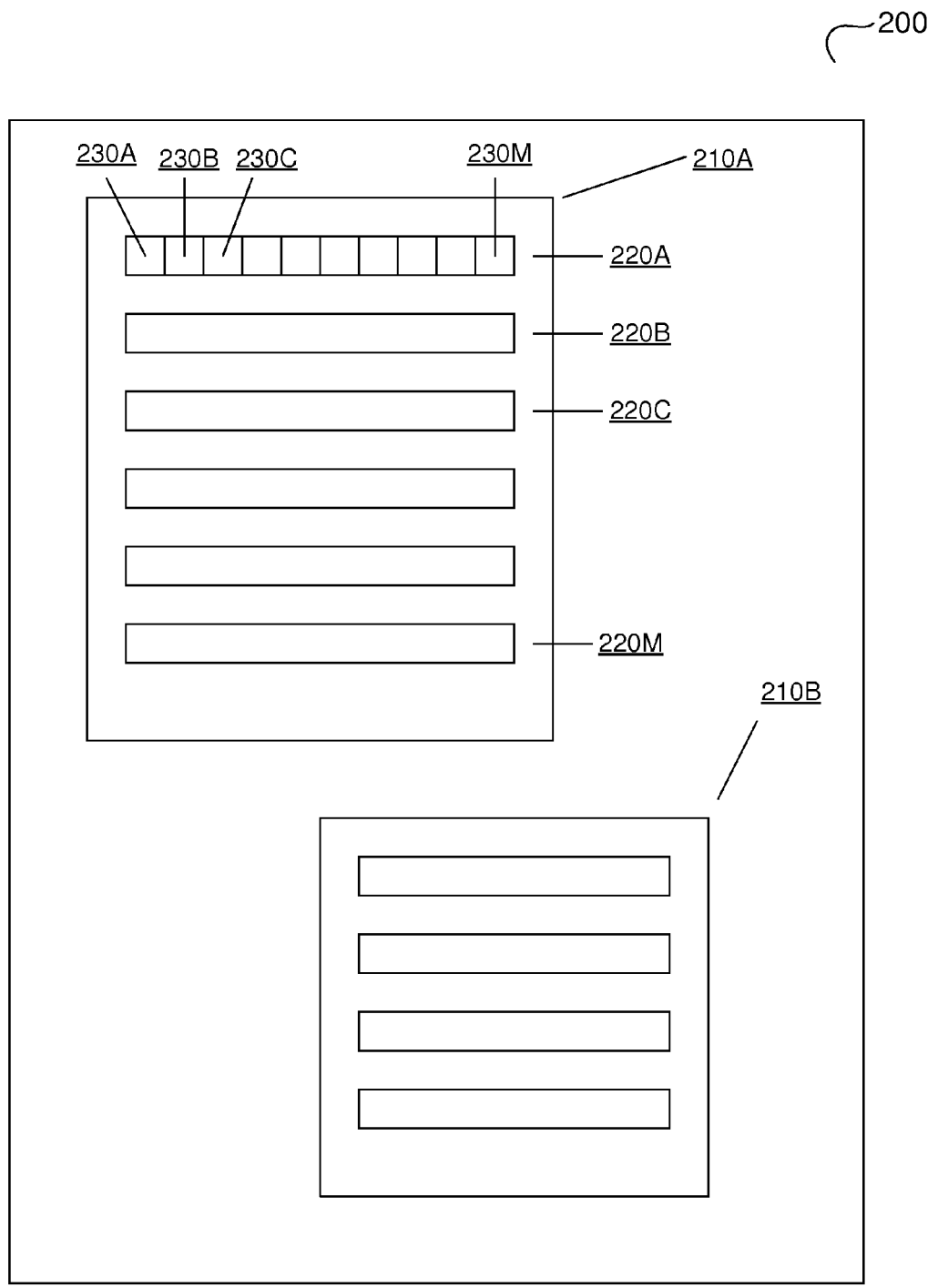
FIG. 2 illustrates an example of a document image that may be processed by an optical character recognition (OCR) application, in accordance with one or more aspects of the present disclosure.

In an illustrative example, computing device 100 may acquire a document image. FIG. 2 illustrates an example of a document image 200 that may be processed by application 190 running on computing device 100 in accordance with one or more aspects of the present disclosure. Application 190 may analyze the acquired document image 200 to detect, within the document image, one or more image fragments comprising text blocks 210A-210B. The illustrated elements of the document layout have been selected for illustrative purposes only and are not intended to limit the scope of this disclosure in any way. Application 190 may further analyze each of image fragments comprising text blocks 210 to detect a plurality of text lines 220A-220M. Within each image fragment comprising a text line 220, application 190 may detect one or more image fragments 230A-230N comprising sequences of characters delimited by whitespaces. Such a sequence of characters may represent, for example, a word comprising one or more letters, or a number comprising one or more digits.

With respect to each image fragment 230, OCR application 190 may identify a sequence of one or more transformations to be applied to at least part of a document image for improving the OCR quality, based on asserting certain hypotheses with respect to one or more characteristics of the image. Such image transformations may be designed to compensate for certain image distortions or other specific image features, in order to facilitate the subsequent character recognition process. Each image transformation may comprise one or more operations to be performed upon the image.

In an illustrative example, for images comprising blurred character elements, OCR application 190 may employ an image transformation designed to increase the image contrast. The image blurring may be caused, e.g., by a poorly focused scanning device. This transformation may be employed by OCR application 190 responsive to evaluating one or more triggering conditions, including: determining that the ratio of the number of pixels comprised by characters to the overall number of pixels within the image fragment falls short of a certain threshold value; determining that the ratio of the number of pixels comprised by the border between the characters and the background to the overall number of pixels within the image fragment exceeds a certain threshold value; and/or determining that the image gradient (a directional change in the intensity or color) falls short of a certain threshold value.

In another illustrative example, for grey scale or color images, OCR application 190 may employ an image binarization transformation designed to produce a monochrome (e.g., black and white) image. To perform the image binarization, OCR application 190 may classify each source pixel as black or white is performed based on a chosen value of the binarization threshold. This transformation may be employed by OCR application 190 responsive to evaluating one or more triggering conditions, including: determining that the character stroke width falls short of a first threshold value or exceeds a second threshold value; determining that the ratio of broken lines to the overall number of characters exceeds a certain threshold value; determining that the ratio of the area occupied by white inter-character gaps to the overall area exceeds a certain threshold value; determining that the ratio of the area occupied by black elements to the overall area exceeds a certain threshold value.

In yet another illustrative example, OCR application 190 may employ an image transformation designed to remove certain pixels of the image that assumingly form a line underlining, striking through, or overlining a character string. This transformation may be employed by OCR application 190 to remove such lines without interfering with the pixels that form the characters themselves. This transformation may be employed by OCR application 190 responsive to evaluating one or more triggering conditions, including: detecting a straight line and determining, based on the position of the detected line, whether the line is underlining, striking through, or overlining a character string.

In yet another illustrative example, OCR application 190 may employ an image transformation designed to adjust the character stroke width. The image transformation may be applied to an image fragment comprising one or more characters having the character stroke width that is different from an average character stroke width by more than a certain threshold value. The image transformation may comprise adding or removing certain pixels adjacent to the character stoke border. This transformation may be employed by OCR application 190 responsive to evaluating one or more triggering conditions, including: detecting one or more characters having the character stroke width that is different from an average character stroke width by more than a certain threshold value.

In yet another illustrative example, OCR application 190 may employ an image transformation designed to adjust the height of uppercase characters. This transformation may be employed by OCR application 190 responsive to determining that the actual height of uppercase characters of the image fragment is different from the height that has previously been determined for the text line that comprises those characters.

In yet another illustrative example, OCR application 190 may employ an image transformation designed to adjust the position of the base line of uppercase characters. This transformation may be employed by OCR application 190 to compensate for possible image distortions resulting, e.g., in skewed or sloped text lines.

In yet another illustrative example, OCR application 190 may employ an image transformation designed to skew the image fragment to compensate for the character slope. This image transformation may comprise shifting lower parts of the image fragments with respect to its upper parts.

In yet another illustrative example, OCR application 190 may employ an image transformation designed to adjust the character width. The image transformation may be applied to an image fragment comprising one or more characters having the character width that is different from an average character width by more than a certain threshold value. The image transformation may comprise compressing or expanding the image fragment along its horizontal axis. This transformation may be employed by OCR application 190 responsive to evaluating one or more triggering conditions, including: detecting one or more characters having the character width that is different from an average character width by more than a certain threshold value.

In yet another illustrative example, OCR application 190 may employ an image transformation designed to remove certain visual noise (e.g., random variations of brightness and/or color of pixels within the image fragment that was not present in the original object). This transformation may be employed by OCR application 190 to compensate for irregularities in straight line borders ("hairy" lines), disjoint certain characters that appear to be visually jointed, or join visually disjoint character elements that belong to a single character. This transformation may be employed by OCR application 190 responsive to evaluating one or more triggering conditions, including: evaluating the ratio of visually small and visually large white or black objects, the number of vertical white lines, the number of horizontal black lines, and/or the average line width.

In yet another illustrative example, OCR application 190 may employ an image transformation designed to employ certain template data intended for recognizing characters of special fonts (e.g., fonts employed by a dot matrix printer, a fax machine, or a cash register). This transformation may be employed by OCR application 190 responsive to evaluating one or more triggering conditions, including evaluating results of one or more character recognition operations and/or receiving a user input indicating the type of the font.

In yet another illustrative example, OCR application 190 may employ an image transformation designed to divide, into two or more fragments corresponding to two or more words, a character string comprised by the image fragment. This transformation may be employed by OCR application 190 responsive to evaluating one or more triggering conditions, including: determining that two or more portions of the image fragment require different image transformations, failing to recognize one or more characters, and/or detecting one or more white image portions that may be interpreted as white spaces delimiting the words.

In yet another illustrative example, OCR application 190 may employ an image transformation designed to perform a more detailed, as compared to a standard detailing rate, analysis of the image fragment in order to detect image portions that divide two or more characters comprised by the image fragment. This transformation may be employed by OCR application 190 responsive to evaluating one or more triggering conditions, including: failing to recognize one or more characters, producing an unsatisfactory ratio of recognized characters to the total number of characters, failing to identify a template corresponding to the image fragment, and/or failing to associate producing punctuation marks with any recognized characters.

In accordance with one or more aspects of the present disclosure, OCR application 190 may identify a sequence of one or more transformations to be applied to the image fragment for improving the OCR quality, as described in more details herein below with references to FIG. 3.

Figure 3:
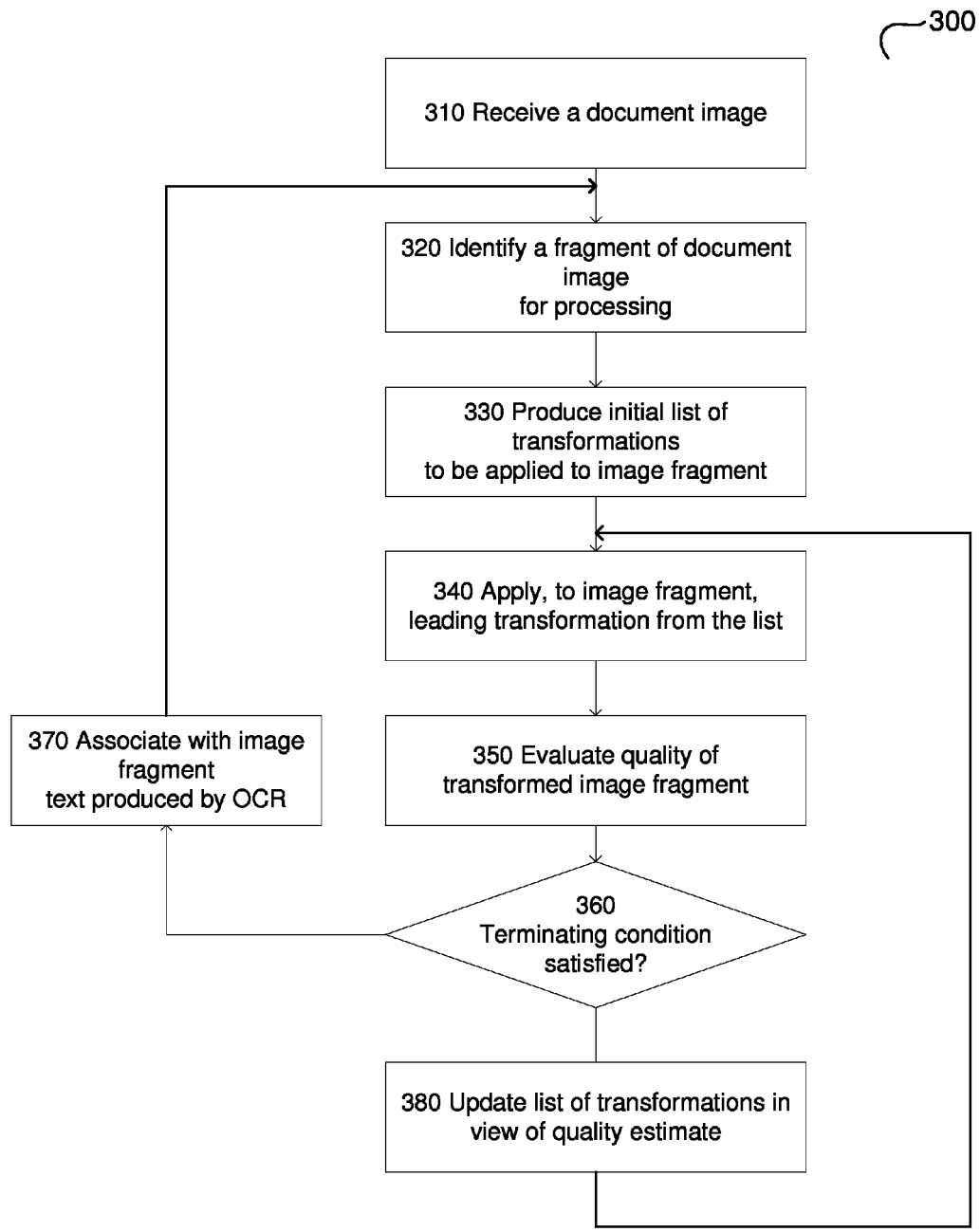
FIG. 3 depicts a flow diagram of an illustrative example of a method for identifying transformations to be applied to at least part of a document image for improving the quality of optical character recognition (OCR), in accordance with one or more aspects of the present disclosure.

FIG. 3 depicts a flow diagram of one illustrative example of a method 300 for identifying transformations to be applied to at least part of a document image for improving the OCR quality, in accordance with one or more aspects of the present disclosure. Method 300 and/or each of its individual functions, routines, subroutines, or operations may be performed by one or more processors of the computer system (e.g., processing device 100 of FIG. 1) executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the processing device performing the method may receive an image of at least a part of a document (e.g., a document page). In an illustrative example, the image may be acquired via an optical input device 130 of example processing device 100 of FIG. 1.

At block 320, the processing device may identify, within the document image, a fragment of a document image to be processed in accordance with one or more aspects of the present disclosure. In an illustrative example, the image fragment may comprise a sequence of characters delimited by white spaces and may represent a word comprising one or more letters, or a number comprising one or more digits.

At block 330, the processing device may produce an initial list of transformations to be applied to the identified image fragment. In certain implementations, the initial list of transformations may be produced by iterating through a master list of known image transformations, and determining, for each image transformation on the master list, a value of a certain criterion based on the values on one or more parameters of the image fragment being processed. Each image transformation of the master list may be included into the initial list of transformations to be applied to the identified image fragment responsive to ascertaining that the value of a corresponding criterion exceeds a certain threshold.

In certain implementations, the master list of transformations may be pre-ordered based on a plurality of image-independent transformation rank values that may be statically assigned to the transformations on the master list and/or based on a plurality of image-independent relationships that may be specified for certain pairs of transformations on the master list (e.g., transformation A always has priority over transformation B). Thus, any list of transformation derived from the master list may inherit the image-independent ordering of the transformations. However, in another case the master list of transformations might be pre-ordered based on existing information about the image. For example, if background texture has been detected on the image the master list of transformation might be pre-ordered to remove background texture before further processing.

Responsive to producing the list of transformations to be applied to the identified image fragment, the processing device may, in certain implementations, further order the list. In certain implementations, the list of transformations may be ordered based on a plurality of ranking scores associated with the transformations. In an illustrative example, an initial ranking score may be assigned to a transformation at the time of adding it to the list of transformations to be applied to the current image fragment. In certain implementations, the initial ranking score associated with a particular transformation may be calculated based on values of certain image parameters. Alternatively, one or more transformations may be assigned default initial ranking scores (e.g., zero).

At block 340, the processing device may apply, to the image fragment, the leading transformation on the sorted list of transformations. As noted herein above, the image transformation may comprise one or more image transformation operations to be performed upon the image.

At block 350, the processing device may evaluate the quality of the transformed image fragment. In certain implementations, the processing device may produce an integral quality score based on the values of one or more criteria that evaluate certain image characteristics. In an illustrative example, the integral quality score may be defined as a weighted sum of the individual criteria values.

In an illustrative example, evaluating a quality criterion may comprise calculating the ratio of the number of characters that the OCR procedure has failed to recognize to the overall number of characters within the image fragment being processed. In another illustrative example, evaluating a quality criterion may comprise ascertaining that no punctuation marks have been left by the OCR procedure as unassociated with any characters. In yet another illustrative example, evaluating a quality criterion may comprise ascertaining that a word produced by the OCR procedure may be found in a dictionary. In yet another illustrative example, evaluating a quality criterion may comprise ascertaining that no image elements (e.g., subscript or superscript characters) have been left by the OCR procedure as unassociated with any characters. In yet another illustrative example, evaluating a quality criterion may comprise ascertaining that two or more neighboring characters have the same or compatible sizes. In yet another illustrative example, evaluating a quality criterion may comprise ascertaining that one or more characters produced by the OCR procedure are compatible with the characters produced by processing other image fragment.

At block 360, the processing device may evaluate one or more terminating conditions in order to determine whether further processing of the current image fragment is needed. In an illustrative example, a terminating condition may compare a certain threshold value to the integral quality score determined based on one or more image characteristics. In another illustrative example, a terminating condition may compare a certain threshold value to the number of iterations that have already been executed with respect to the current image fragment. In yet another illustrative example, a terminating condition may compare a certain threshold value to the amount of memory available to the OCR procedure.

Responsive to determining that one or more terminating conditions have been evaluated as true, the method may branch to block 370; otherwise, the processing may continue at block 380.

At block 370, the processing device may associate, with the image fragment, the text produced by OCR performed for evaluating the quality of the transformed image fragment at block 350. The method may loop back to identifying next fragment at block 320.

At block 380, the processing device may update the list of transformations in view of the quality estimate of the transformed image fragment. In certain implementations, the list may be sorted based on updated ranking scores associated with the transformations on the list. In an illustrative example, the ranking scores associated with the transformations may be updated based on the integral quality score that was determined, at block 350, for the current image fragment after applying the leading transformation on the list (i.e., the last transformation that has been applied to the image fragment). The adjustment to a ranking score of a particular transformation on the list may be dependent on the similarity, in view of a chosen transformation similarity metric, of the particular transformation to the leading transformation on the list. In an illustrative example, the ranking score associated with a particular transformation may be adjusted by an integral quality score fraction which is proportional to the value of the similarity metric of the particular transformation to the leading transformation on the list:

$$S_i = S_i + Q_l * M(i,l),$$

wherein $S_i$ is the value of the ranking score associated with i-th transformation on the list, $Q_l$ is the integral quality score for the current image fragment determined after applying the leading transformation on the list, and $M(i,l)$ is the value of the similarity metric of the i-th transformation with respect to the leading transformation on the list.

Alternatively, the ranking score associated with a particular transformation may be adjusted by a certain value derived from the integral quality score, responsive to determining that the value of the similarity metric of the particular transformation to the leading transformation on the list exceeds a certain similarity threshold:

$$S_i = S_i + k * M(i,l) \text{ for every } S_i \text{ such that } M(i,l) > T,$$

wherein $S_i$ is the value of the ranking score associated with i-th transformation on the list, k is a constant value, $M(i,l)$ is the value of the similarity metric of the i-th transformation with respect to the leading transformation on the list, and T is a similarity metric threshold value.

The above described methods of adjusting ranking values are intended for illustrative purposes only and should not be interpreted to limit the scope of this disclosure in any way.

The transformation similarity metric may, in certain implementations, be based on comparing the image transformation operations comprised by the two transformations the similarity of which is being estimated. In certain implementations, the transformation similarity metric value of two transformations may be determined a ratio of the number of matching image transformation operations comprised by the two transformations to the maximum number of image transformation operations comprised by one of the transformations:

$$M(A, B) = N_m / N_{max}(A,B)$$

wherein $M(A, B)$ is the value of the similarity metric of transformations A and B, $N_m$ is the number of matching image transformation operations comprised by the two transformations, and $N_{max}(A,B)$ is the maximum number of image transformation operations comprised by one of the transformations.

Alternatively, the transformation similarity metric value of two transformations may be proportional to the number of matching image transformation operations comprised by the two transformations:

$$M(A, B) = k * N_m$$

wherein k is a constant value.

The above described various transformation similarity metrics are intended for illustrative purposes only and should not be interpreted to limit the scope of this disclosure in any way.

In certain implementations, ordering the list of transformations may further comprise applying one or more differential rules to compare at least two transformations on the list. A differential rule may be based on an a priori stipulation requiring to give a certain transformation a priority over another transformation, irrespectively of the ranking score values assigned to both transformations.

In certain implementations, updating the list of transformations in view of the quality estimate of the transformed image fragment may further removing certain transformations from the list and/or adding certain transformations to the list. In an illustrative example, the processing device may remove a particular transformation from the list, responsive do determining that the value of the similarity metric of the particular transformation to the leading transformation on the list falls short of a certain similarity threshold. In another illustrative example, the processing device may add a particular transformation from the list, responsive do determining that the value of the similarity metric of the particular transformation to the leading transformation on the list exceeds a certain similarity threshold.

Upon completing the operations described herein above with references to block 380, the method may loop back to block 340.

Figure 4:
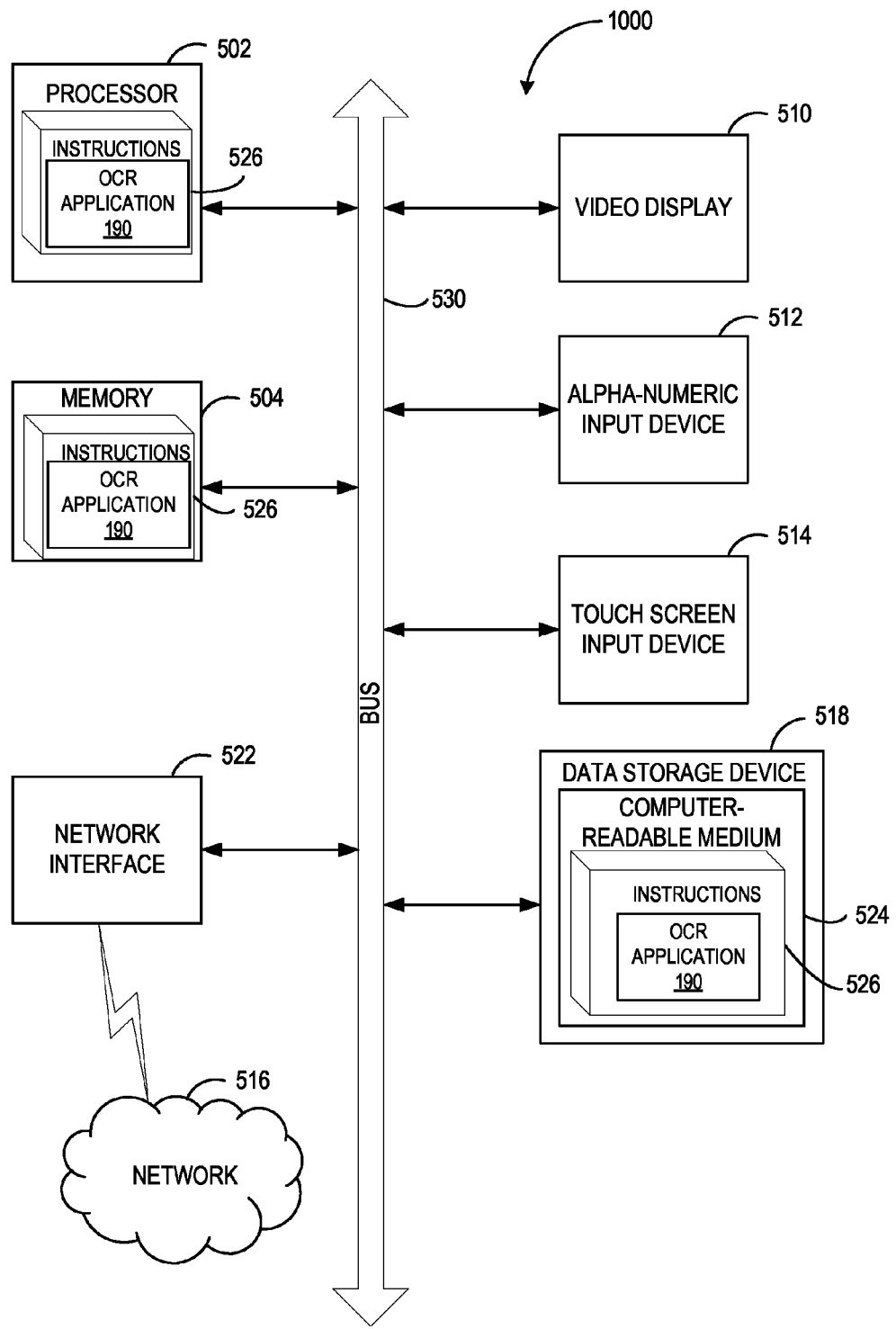
FIG. 4 depicts a more detailed diagram of an illustrative example of a computing device implementing the methods described herein.

FIG. 4 illustrates a more detailed diagram of an example computing device 1000 within which a set of instructions, for causing the computing device to perform any one or more of the methods discussed herein, may be executed. The computing device 1000 may include the same components as computing device 100 of FIG. 1, as well as some additional or different components, some of which may be optional and not necessary to provide aspects of the present disclosure. The computing device may be connected to other computing device in a LAN, an intranet, an extranet, or the Internet. The computing device may operate in the capacity of a server or a client computing device in client-server network environment, or as a peer computing device in a peer-to-peer (or distributed) network environment. The computing device may be a provided by a personal computer (PC), a tablet PC, a set-top box (STB), a Personal Digital Assistant (PDA), a cellular telephone, or any computing device capable of executing a set of instructions (sequential or otherwise) that specify operations to be performed by that computing device. Further, while only a single computing device is illustrated, the term "computing device" shall also be taken to include any collection of computing devices that individually or jointly execute a set (or multiple sets) of instructions to perform any one or more of the methodologies discussed herein.

Exemplary computing device 1000 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose processing devices such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions 526 for performing the operations and functions discussed herein.

Computing device 1000 may further include a network interface device 522, a video display unit 510, an character input device 512 (e.g., a keyboard), and a touch screen input device 514.

Data storage device 518 may include a computer-readable storage medium 524 on which is stored one or more sets of instructions 526 embodying any one or more of the methodologies or functions described herein. Instructions 526 may also reside, completely or at least partially, within main memory 504 and/or within processor 502 during execution thereof by computing device 1000, main memory 504 and processor 502 also constituting computer-readable storage media. Instructions 526 may further be transmitted or received over network 516 via network interface device 522.

In certain implementations, instructions 526 may include instructions of method 800 for identifying transformations to be applied to at least part of a document image for improving the OCR quality, and may be performed by application 190 of FIG. 1. While computer-readable storage medium 524 is shown in the example of FIG. 4 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computing device, or similar electronic computing device, that manipulates and transforms data represented as physical (e.g., electronic) quantities within the computing device's registers and memories into other data similarly represented as physical quantities within the computing device memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
producing, by a computer system, an ordered list of transformations to be applied to an image representing a character string, each transformation corresponding to a hypothesis asserted with respect to one or more characteristics of the image;
applying, to the image, a leading transformation on the list to produce a transformed image;
evaluating a quality of the transformed image to produce a quality estimate; and
updating the list in view of the quality estimate,
wherein evaluating the quality of the transformed image comprises performing an optical character recognition of the text comprises by the image.

2. The method of claim 1, wherein each transformation of the list of transformations comprises one or more operations to be performed on the image.

3. The method of claim 1, further comprising identifying the image as a fragment of a larger image comprising a textual block.

4. The method of claim 1, wherein producing the ordered list of transformations comprises evaluating, in view of values of one or more parameters of the image, one or more criteria associated with a plurality of transformations.

5. The method of claim 1, wherein updating the list comprises:
updating, in view of the quality estimate, integrated scores assigned to one or more transformations; and
selecting a new leading transformation in view of the updated integrated scores.

6. The method of claim 5, wherein selecting the new leading transformation comprises applying one or more differential rules to compare at least two transformations on the list.

7. The method of claim 1, wherein updating the list comprises at least one of: ordering the list, adding a transformation to the list, or removing a transformation from the list.

8. The method of claim 1, further comprising: responsive to determining that the quality estimate fails short of a certain threshold value, repeating the operations of applying, evaluating, and updating.

9. The method of claim 1, further comprising:
responsive to determining that the quality estimate exceeds a certain threshold value, associating, with the image, a text produced by the optical character recognition.

10. A computing device, comprising:
a memory;
a processor, coupled to the memory, the processor configured to: produce an ordered list of transformations to be applied to an image representing a character string, each transformation corresponding to a hypothesis asserted with respect to one or more characteristics of the image;
apply, to the image, a leading transformation on the list to produce a transformed image;
evaluate a quality of the transformed image to produce a quality estimate; and
update the list in view of the quality estimate,
wherein evaluating the quality of the transformed image comprises performing an optical character recognition of the text comprises by the image.

11. The computing device of claim 10, wherein producing the ordered list of transformations comprises evaluating, in view of values of one or more parameters of the image, one or more criteria associated with a plurality of transformations.

12. The computing device of claim 10 wherein updating the list comprises:
updating, in view of the quality estimate, integrated scores assigned to one or more transformations; and
selecting a new leading transformation in view of the updated integrated scores.

13. The computing device of claim 12, wherein selecting the new leading transformation comprises applying one or more differential rules to compare at least two transformations on the list.

14. A computer-readable non-transitory storage medium comprising executable instructions that, when executed by a computing device, cause the computing device to perform operations comprising:
producing, an ordered list of transformations to be applied to an image representing a character string, each transformation corresponding to a hypothesis asserted with respect to one or more characteristics of the image;
applying, to the image, a leading transformation on the list to produce a transformed image:
evaluating a quality of the transformed image to produce a quality estimate; and
updating the list in view of the quality estimate,
wherein evaluating the quality of the transformed image comprises performing an optical character recognition of the text comprises by the image.

15. The computer-readable non-transitory storage medium of claim 14, wherein updating the list comprises:
updating, in view of the quality estimate, integrated scores assigned to one or more transformations: and
selecting a new leading transformation in view of the updated integrated scores.

16. The computer-readable non transitory storage medium of claim 14, wherein updating the list comprises at least one of:
ordering the list, adding a transformation to the list, or removing a transformation from the list.

17. The computer-readable non-transitory storage medium of claim 14, further comprising executable instructions causing the computing device to perform operations comprising:
responsive to determining that the quality estimate falls short of a certain threshold value, repeating the operations of applying, evaluating, and updating.

18. The computer-readable non-transitory storage medium of claim 14, further comprising executable instructions causing the computing device to perform operations comprising:
responsive to determining that the quality estimate exceeds a certain threshold value, associating, with the image, a text produced by the optical character recognition.

* * * * *